US012659162B2

(12) United States Patent
Herman et al.

(10) Patent No.: US 12,659,162 B2
(45) Date of Patent: Jun. 16, 2026

(54) TECHNIQUES FOR PROVIDING A DIGITAL KEYCHAIN FOR PHYSICAL OBJECTS

(71) Applicant: Apple Inc., Cupertino, CA (US)

(72) Inventors: Brad K. Herman, Culver City, CA (US); Shiraz Akmal, Playa Vista, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 18/598,864

(22) Filed: Mar. 7, 2024

(65) Prior Publication Data

US 2024/0214208 A1 Jun. 27, 2024

Related U.S. Application Data

(63) Continuation of application No. PCT/US2022/044036, filed on Sep. 19, 2022.
(Continued)

(51) Int. Cl.
H04L 29/06 (2006.01)
E05B 65/00 (2006.01)
(Continued)

(52) U.S. Cl.
CPC ............ H04L 9/3231 (2013.01); E05B 65/00 (2013.01); G06T 7/50 (2017.01); G06T 7/62 (2017.01)

(58) Field of Classification Search
CPC . H04L 9/3231; G06T 7/62; G06T 7/50; E05B 65/00
See application file for complete search history.

(56) References Cited

U.S. PATENT DOCUMENTS 9,628,844 B2 4/2017 Conrad et al.
9,946,862 B2 4/2018 Yun et al.
(Continued)

FOREIGN PATENT DOCUMENTS

CN 102340590 A 2/2012
CN 102750087 A 10/2012
(Continued)

OTHER PUBLICATIONS

"Ask Alexa—Things That Are Smart Wiki", Online available at: <http://thingsthataresmart.wiki/index.php?title=Ask_Alexa&oldid=4283>, Jun. 8, 2016, pp. 1-31.
(Continued)

*Primary Examiner* — Evans Desrosiers
(74) *Attorney, Agent, or Firm* — YHE Law LLP

(57) ABSTRACT

This relates generally to intelligent automated assistants and, more specifically, to provide a digital keychain for physical objects. An example method includes receiving a user request and in response to receiving the user request, scanning one or more objects within a real-world environment using a real-time capturing device associated with the electronic device in response to receiving a user request, generating one or more views of the one or more objects, identifying at least one of the one or more objects as a locking device based on the one or more views, authenticating the user based on biometric data and contextual information, obtaining instructions for unlocking the locking device in response to authenticating the user, and providing the instructions to the user.

48 Claims, 7 Drawing Sheets

Related U.S. Application Data

(60) Provisional application No. 63/247,606, filed on Sep. 23, 2021.

(51) Int. Cl.
  *G06T 7/50* (2017.01)
  *G06T 7/62* (2017.01)
  *H04L 9/32* (2006.01)

(56) References Cited

U.S. PATENT DOCUMENTS

| | | | | |
|---|---|---|---|---|
| 10,146,923 | B2 | 12/2018 | Pitkänen et al. | |
| 10,489,651 | B2 | 11/2019 | Luccin et al. | |
| 10,798,438 | B2 | 10/2020 | Conrad et al. | |
| 11,100,204 | B2* | 8/2021 | Alameh | H04L 63/0861 |
| 11,908,159 | B2 | 2/2024 | Haapoja et al. | |
| 12,020,667 | B2 | 6/2024 | Griswold et al. | |
| 2010/0257490 | A1 | 10/2010 | Lyon et al. | |
| 2010/0269040 | A1 | 10/2010 | Lee | |
| 2011/0260829 | A1 | 10/2011 | Lee | |
| 2012/0209454 | A1 | 8/2012 | Miller et al. | |
| 2013/0244615 | A1 | 9/2013 | Miller | |
| 2017/0251143 | A1* | 8/2017 | Peruch | H04N 13/243 |
| 2019/0121950 | A1* | 4/2019 | Gupta | G06F 21/32 |
| 2019/0230426 | A1 | 7/2019 | Chun | |
| 2019/0340419 | A1 | 11/2019 | Milman et al. | |
| 2019/0370448 | A1* | 12/2019 | Devine | G06F 21/32 |
| 2023/0401798 | A1 | 12/2023 | Bigham et al. | |

FOREIGN PATENT DOCUMENTS

| | | | |
|---|---|---|---|
| CN | 104374399 | A | 2/2015 |
| CN | 104573472 | A | 4/2015 |
| WO | 2014/078965 | A1 | 5/2014 |
| WO | 2019/240669 | A1 | 12/2019 |
| WO | 2021/053131 | A1 | 3/2021 |

OTHER PUBLICATIONS

Rowland et al., "Designing Connected Products: UX for the Consumer Internet of Things", O'Reilly, May 2015, 452 pages.

Samsung, "SGH-a885 Series—Portable Quad-Band Mobile Phone-User Manual", Retrieved from the Internet: URL:http://web.archive.org/web/20100106113758/http://www.comparecellular.com/images/phones/userguide1896.pdf, Jan. 1, 2009, 144 pages.

Graus et al., "Analyzing and Predicting Task Reminders", Conference on User Modeling Adaptation and Personalization, 2016, 9 pages.

Gu et al., "Alohomora: Motion-Based Hotword Detection in Head-Mounted Displays", IEEE Internet of Things Journal, vol. 7, No. 1, Jan. 2020, pp. 611-620.

Pradhan et al., "Understanding and Managing Notifications", IEEE Infocom 2017—IEEE Conference on Computer Communications, 2017, 9 pages.

International Preliminary Report on Patentability received for PCT Patent Application No. PCT/US2022/044036, mailed on Apr. 4, 2024, 10 pages.

International Search Report and Written Opinion received for PCT Patent Application No. PCT/US2022/044036, mailed on Dec. 16, 2022, 13 pages.

* cited by examiner

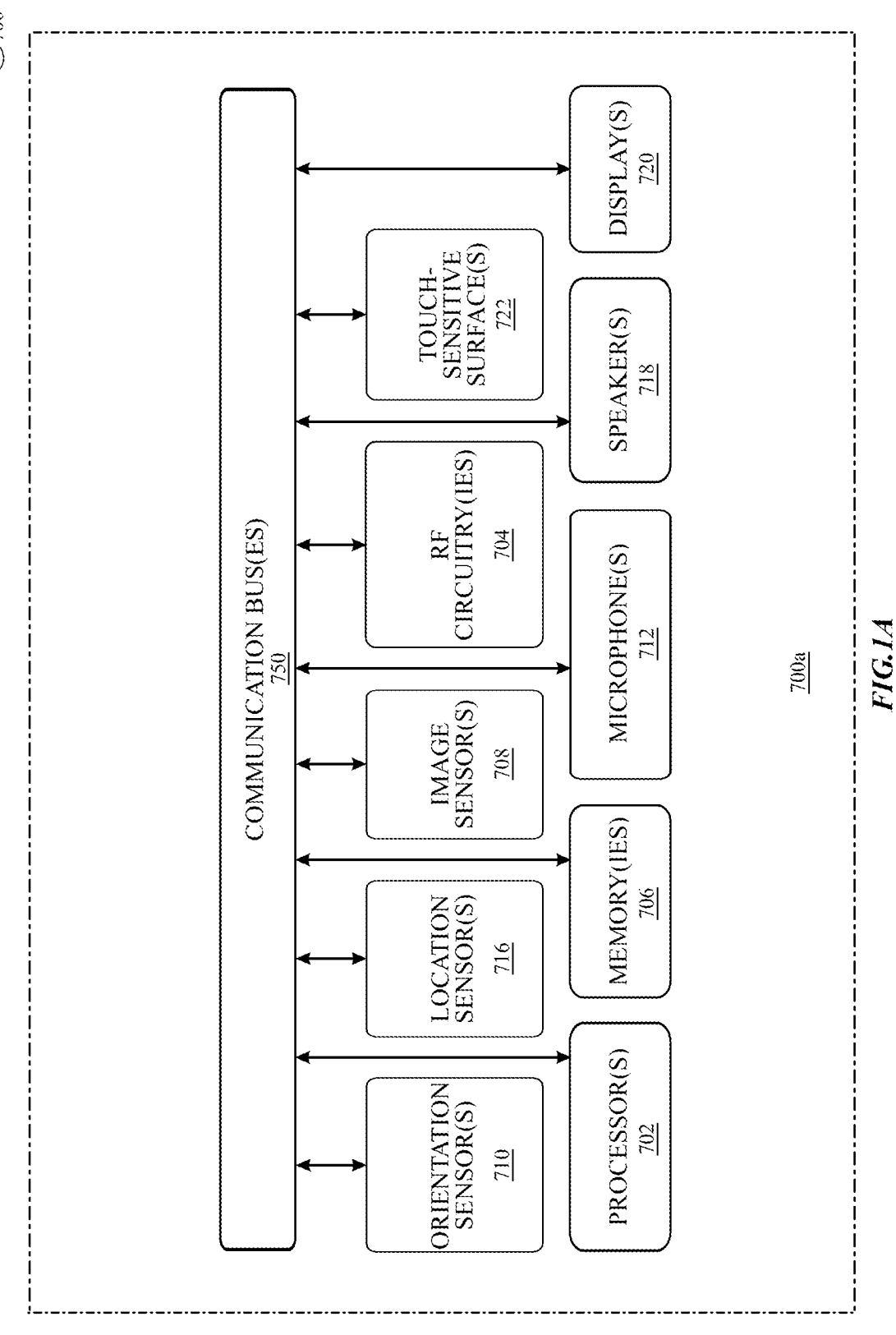
_FIG.1A_

1200

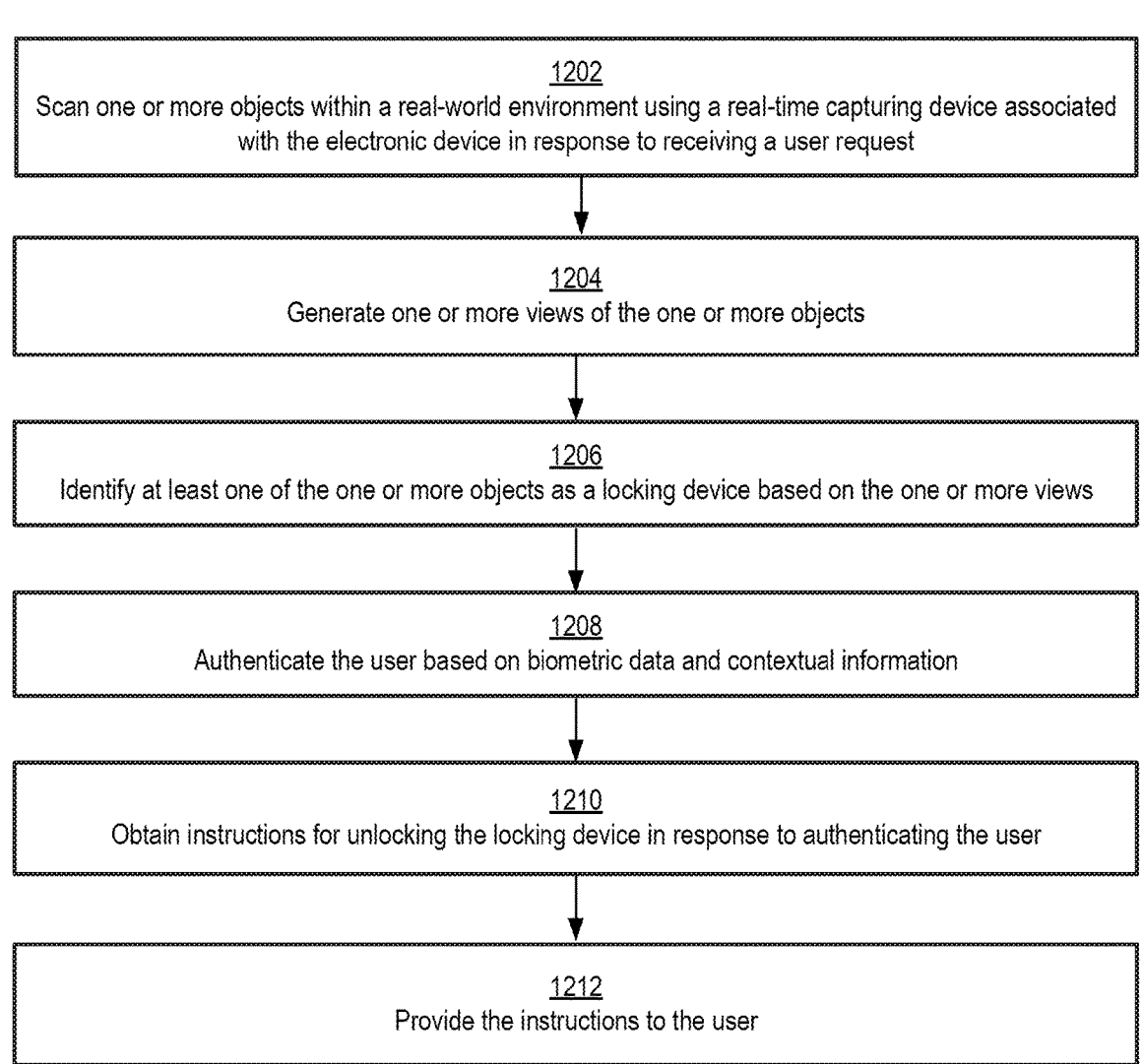

<div style="text-align:center">

1202
Scan one or more objects within a real-world environment using a real-time capturing device associated with the electronic device in response to receiving a user request

1204
Generate one or more views of the one or more objects

1206
Identify at least one of the one or more objects as a locking device based on the one or more views

1208
Authenticate the user based on biometric data and contextual information

1210
Obtain instructions for unlocking the locking device in response to authenticating the user

1212
Provide the instructions to the user

</div>

FIG. 6

TECHNIQUES FOR PROVIDING A DIGITAL KEYCHAIN FOR PHYSICAL OBJECTS

CROSS-REFERENCE TO RELATED APPLICATIONS

This application is a continuation of PCT Patent Application Serial No. PCT/US2022/044036, entitled "TECHNIQUES FOR PROVIDING A DIGITAL KEYCHAIN FOR PHYSICAL OBJECTS," filed on Sep. 19, 2022, which claims priority to U.S. Provisional Patent Application No. 63/247,606, entitled "TECHNIQUES FOR PROVIDING A DIGITAL KEYCHAIN FOR PHYSICAL OBJECTS," filed Sep. 23, 2021. The contents of each of these applications are incorporated herein by reference in their entirety.

FIELD

This relates generally to intelligent digital assistants and, more specifically, to providing a digital keychain for physical objects.

BACKGROUND

Intelligent automated assistants (or digital assistants) can provide a beneficial interface between human users and electronic devices. Such assistants can allow users to interact with devices or systems via natural language input in spoken, textual, or other forms. For instance, a user can issue a request to a digital assistant operating on an electronic device (e.g., portable multifunctional devices such as a mobile phones, laptop computers, tablet computers, gaming devices, streaming media devices, digital video recorders, etc.). In response to the request, the digital assistant can respond based on available information to the digital assistant. Specifically, the digital assistant may store and provide digital information (e.g., an email password) associated with the user on an electronic device implementing the digital assistant.

SUMMARY

Systems and methods are disclosed for providing a digital keychain for physical objects on an electronic device. In an example method, a user request is received. In response to receiving the user request, the method scans one or more objects within a real-world environment using a real-time capturing device associated with the electronic device. The method further generates one or more views of the one or more objects, identifies at least one of the one or more objects as a locking device based on the one or more views, authenticates the user based on biometric data and contextual information, obtains instructions for unlocking the locking device in response to authenticating the user, and provides the instructions to the user.

Example non-transitory computer-readable media are disclosed herein. An example non-transitory computer-readable storage medium stores one or more programs. The one or more programs comprise instructions, which when executed by one or more processors of an electronic device, cause the electronic device to receive a user request. In response to receiving the user request, the one or more processors causes the electronic device to scan one or more objects within a real-world environment using a real-time capturing device associated with the electronic device. The one or more processors causes the electronic device further generate one or more views of the one or more objects, identify at least one of the one or more objects as a locking device based on the one or more views, authenticate the user based on biometric data and contextual information, obtain instructions for unlocking the locking device in response to authenticating the user, and provide the instructions to the user.

Example electronic devices are disclosed herein. An example electronic device comprises one or more processors; a memory; and one or more programs, where the one or more programs are stored in the memory and configured to be executed by the one or more processors, the one or more programs including instructions for receiving a user request. In response to receiving the user request, the one or more programs further includes instructions to scan one or more objects within a real-world environment using a real-time capturing device associated with the electronic device. The one or more programs further includes instructions to generate one or more views of the one or more objects, identify at least one of the one or more objects as a locking device based on the one or more views, authenticate the user based on biometric data and contextual information, obtain instructions for unlocking the locking device in response to authenticating the user, and provide the instructions to the user.

An example electronic device comprises means for receiving a user request, scanning one or more objects within a real-world environment using a real-time capturing device associated with the electronic device in response to receiving a user request, generating one or more views of the one or more objects, identifying at least one of the one or more objects as a locking device based on the one or more views, authenticating the user based on biometric data and contextual information, obtaining instructions for unlocking the locking device in response to authenticating the user, and providing the instructions to the user.

In some examples, the above illustrated methods and techniques allow a digital assistant or a digital keychain system to intelligently provide a digital keychain for a variety of physical objects used by a user. Users may try to access certain physical objects (e.g., a bike lock) using private information (e.g., a key code, passcode, password, etc.) associated with the physical objects. Generally, users may write down passcodes or private information for physical objects (e.g., bike lock, safe lock, wireless modem, etc.) on a piece of paper or a notebook, or may manually save a list of passwords or codes in an email or a note on smart phones or other electronic devices. Accordingly, while trying to retrieve a passcode (or private information) for these physical objects, a user may need to spend a considerable amount of time to locate a piece of paper or a notebook with passcodes or to identify a specific passcode associated to a physical object from many different passcodes.

In addition, writing a list of passwords, codes or other private information in a notebook can be dangerous as a person may lose the notebook, or an adversary or unauthorized person may get access to the notebook. Storing passcodes or private information in an email or an unprotected file on an electronic device is more dangerous as a hacker can easily access this information. Moreover, none of these methods helps users to efficiently identify a correct physical object and step by step instruction for accessing the physical objects. For example, if a user uses multiple similar looking combination locks on a door, the user may not be able to easily identify which combination or passcode written in a notebook is associated with a specific combination lock.

A digital assistant or a digital keychain, discussed in the above illustrated methods, identifies physical objects, authenticates users, and provides secure access to passwords or codes for the physical objects to the users. The above illustrated methods makes the process of storing, managing, and accessing information about physical objects simple and efficient by reducing a user's time in identifying a physical object and locating private information for the physical object, and by reducing manual user inputs required for physical objects, access information, and other data on an electronic device.

BRIEF DESCRIPTION OF THE DRAWINGS

FIGS. 1A-1B depict exemplary systems for use in various extended reality technologies, according to various examples.

FIG. 6 illustrates a process for providing private information for physical objects, according to various examples.

DETAILED DESCRIPTION

Figure 1B:
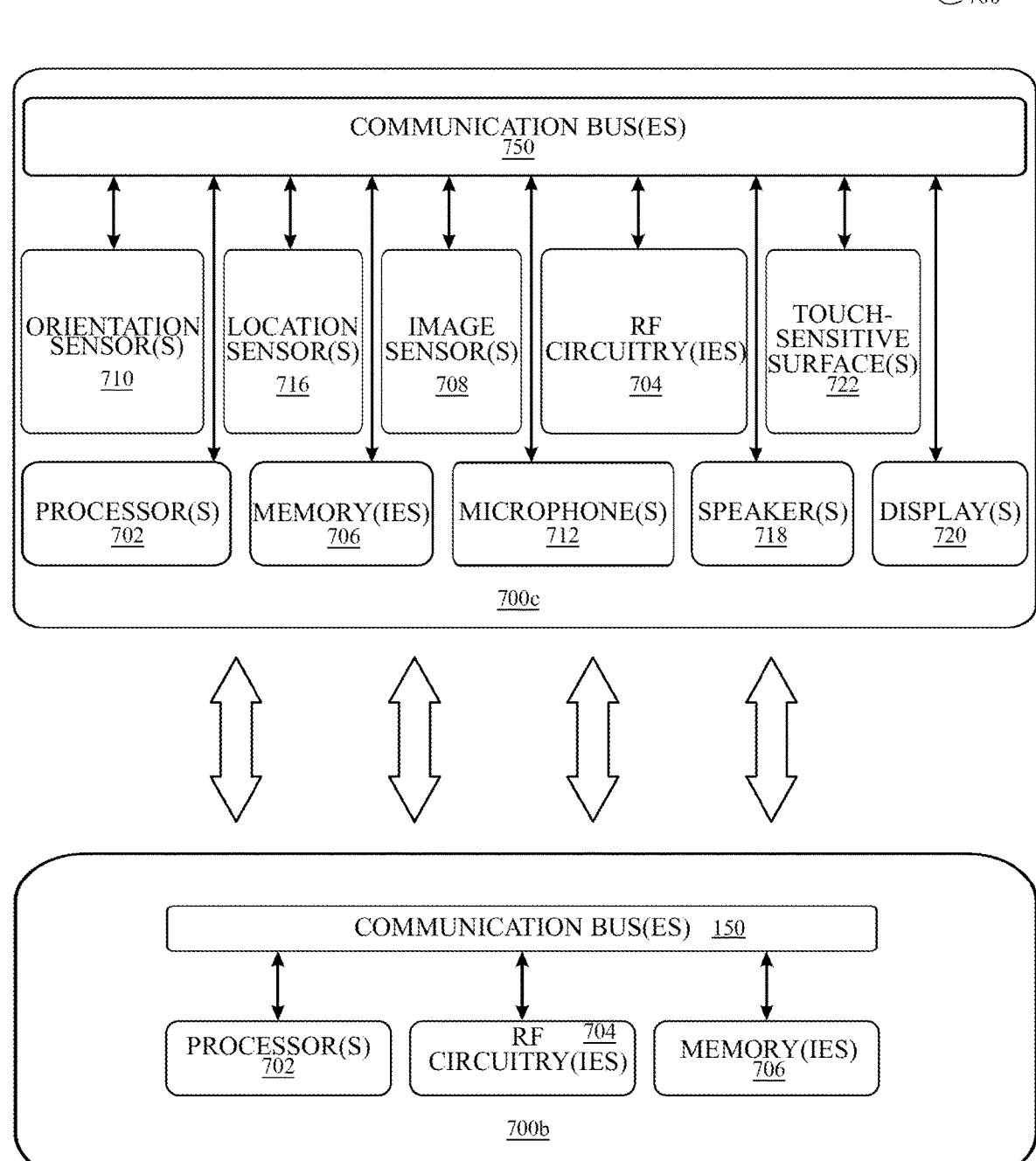

In the following description of examples, reference is made to the accompanying drawings in which are shown by way of illustration specific examples that can be practiced. It is to be understood that other examples can be used and structural changes can be made without departing from the scope of the various examples.

A digital assistant may be used within a computer generated reality (CGR) environment. In some embodiments, upon invocation, a digital assistant object representing the digital assistant may be positioned at a first location within the CGR environment but outside of a current field of view of a user, and an indication of the digital assistant object's location may be provided. In some embodiments, upon invocation, a digital assistant object may be positioned at a first location within the CGR environment but outside of a current field of view of a user and then animated moving from the first location to a second, visible location.

This disclosure relates to systems and processes for intelligently managing private information for physical objects by a digital assistant. Traditionally, password managers, web browsers, or digital assistants may only manage a user's digital information on the user's device. For example, a password manager may store and manage a user's email or online bank passwords. However, the password manager does not store, manage, or provide private information involving physical objects (e.g., a bike lock) in a real-world environment that are associated with the user. Generally, to remember private information of the physical objects, a user may write down the private information such as passcode, pin code, and the like about physical objects on a piece of paper or in a notebook. This method is highly insecure and inefficient as the user may lose the paper or someone unauthorized may access the paper. In addition, while trying to retrieve a passcode, a user may spend a considerable amount of time to locate the piece of paper or notebook with passcodes and to locate a specific passcode from many different passcodes.

The digital assistant, as discussed herein, intelligently identifies physical objects, authenticates users, and provides secure access to passwords or codes for the physical objects to the users. The techniques, as discussed herein, makes a process of storing, managing, and accessing information about physical objects simple and efficient (e.g., by reducing user inputs required for physical objects, access information, and other data). The digital assistant, as discussed herein, may provide step by step instructions for a user to access physical objects. The digital assistant, as discussed herein, may provide private information in a user's preferred format and in a secure manner based on a user's circumstances. This can be desirable for improving user experience by decreasing the amount of time spent storing and searching for private information for physical objects.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1A and FIG. 1B depict exemplary system 700 for use in various computer-generated reality technologies.

In some examples, as illustrated in FIG. 1A, system 700 includes device 700a. Device 700a includes various components, such as processor(s) 702, RF circuitry(ies) 704, memory(ies) 706, image sensor(s) 708, orientation sensor(s) 710, microphone(s) 712, location sensor(s) 716, speaker(s) 718, display(s) 720, and touch-sensitive surface(s) 722. These components optionally communicate over communication bus(es) 750 of device 700a.

In some examples, elements of system 700 are implemented in a base station device (e.g., a computing device, such as a remote server, mobile device, or laptop) and other elements of system 700 are implemented in a head-mounted display (HMD) device designed to be worn by the user, where the HMD device is in communication with the base station device. In some examples, device 700a is implemented in a base station device or HMD device.

As illustrated in FIG. 1B, in some examples, system 700 includes two (or more) devices in communication, such as through a wired connection or a wireless connection. First device 700b (e.g., a base station device) includes processor(s) 702, RF circuitry(ies) 704, and memory(ies) 706. These components optionally communicate over communication bus(es) 750 of device 700b. Second device 700c (e.g., a head-mounted device) includes various components, such as processor(s) 702, RF circuitry(ies) 704, memory(ies) 706, image sensor(s) 708, orientation sensor(s) 710, microphone(s) 712, location sensor(s) 716, speaker(s) 718, display(s) 720, and touch-sensitive surface(s) 722. These components optionally communicate over communication bus(es) 750 of device 700c.

System 700 includes processor(s) 702 and memory(ies) 706. Processor(s) 702 include one or more general processors, one or more graphics processors, and/or one or more digital signal processors. In some examples, memory(ies) 706 are one or more non-transitory computer-readable storage mediums (e.g., flash memory, random access memory) that store computer-readable instructions configured to be executed by processor(s) 702 to perform the techniques described below.

System 700 includes RF circuitry(ies) 704. RF circuitry(ies) 704 optionally include circuitry for communicating with electronic devices, networks, such as the Internet, intranets, and/or a wireless network, such as cellular networks and wireless local area networks (LANs). RF circuitry(ies) 704 optionally includes circuitry for communicating using near-field communication and/or short-range communication, such as Bluetooth®.

System 700 includes display(s) 720. In some examples, display(s) 720 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 720 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 700 includes touch-sensitive surface(s) 722 for receiving user inputs, such as tap inputs and swipe inputs. In some examples, display(s) 720 and touch-sensitive surface(s) 722 form touch-sensitive display(s).

System 700 includes image sensor(s) 708. Image sensors(s) 708 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 708 also optionally include one or more event camera(s) configured to capture movement of physical objects in the real environment. Image sensor(s) 708 also optionally include one or more depth sensor(s) configured to detect the distance of physical objects from system 700. In some examples, system 700 uses CCD sensors, event cameras, and depth sensors in combination to detect the physical environment around system 700. In some examples, image sensor(s) 708 include a first image sensor and a second image sensor. The first image sensor and the second image sensor are optionally configured to capture images of physical objects in the real environment from two distinct perspectives. In some examples, system 700 uses image sensor(s) 708 to receive user inputs, such as hand gestures. In some examples, system 700 uses image sensor(s) 708 to detect the position and orientation of system 700 and/or display(s) 720 in the real environment. For example, system 700 uses image sensor(s) 808 to track the position and orientation of display(s) 720 relative to one or more fixed objects in the real environment.

In some examples, system 700 includes microphones(s) 712. System 700 uses microphone(s) 712 to detect sound from the user and/or the physical setting of the user. In some examples, microphone(s) 712 includes an array of microphones (including a plurality of microphones) that optionally operate in tandem, such as to identify ambient noise or to locate the source of sound in space of the real environment.

System 700 includes orientation sensor(s) 710 for detecting orientation and/or movement of system 700 and/or display(s) 720. For example, system 700 uses orientation sensor(s) 710 to track changes in the position and/or orientation of system 700 and/or display(s) 720, such as with respect to physical objects in the real environment. Orientation sensor(s) 710 optionally include one or more gyroscopes and/or one or more accelerometers.

2. Systems and Techniques for Digital Keychain

Figure 2:
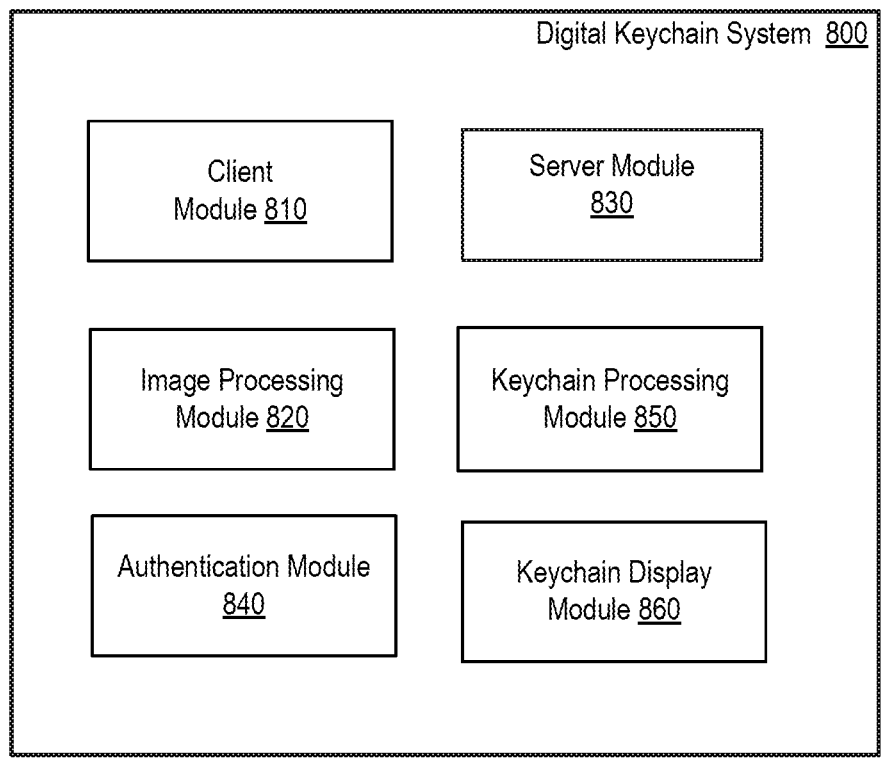
FIG. 2 illustrates a block diagram for a digital keychain system, according to various examples.

FIG. 2 illustrates a block diagram for a digital keychain system, according to various examples. The high level system diagram includes a digital keychain system 800 for carrying out a process, for example, using one or more electronic devices implementing a digital assistant. In some examples, system 800 is implemented using a client-server system (e.g., system 700), and the modules of system 800 are divided up in any manner between the server and a client device. In some examples, the modules of system 800 are divided up between the server and multiple client devices (e.g., a mobile phone and virtual reality headset). Thus, while portions of functions carried out by the system 800 are described herein as being performed by particular devices of a client-server system, it will be appreciated that system 800 is not so limited. In other examples, functions carried out by the modules within the system 800 are performed using only a client device (e.g., a user device) or only multiple client devices. In the system 800, some modules are, optionally, combined, the order of some modules is, optionally, changed, and some modules are, optionally, omitted. In addition, the system 800 may be integrated into any other function or application of a client device instead of the digital assistant.

In accordance with some implementations, the digital keychain system 800 may include a client module 810 which may include a display that provides an input interface and an output interface between the client (or user) device and a user. The input interface may be an icon of a digital assistant or an icon of a keychain application for a user to provide user requests. Further, the client module 810 may have an access to a capturing device (e.g., a camera) within the client device for capturing user inputs such as two-dimensional or three-dimensional pictures and/or videos of physical or real-world objects (e.g., a locking device of a bicycle). The display displays a visual output to the user. The visual output includes three-dimensional or two dimensional graphics, text, icons, video, or any combination thereof. The display may receive the visual output from the keychain display module 860. In some instances, the client module 810 may provide audio output using one or more audio output devices (e.g., speaker) to the client (or user) device.

In some examples, the digital keychain system 800 includes an image processing module 820 that directly interacts with the client module 810 (or user interface associated with the client module 810) of a client device, as shown in FIG. 2. In some examples, the image processing module 820 may process captured data (e.g., images and/or videos) of physical objects from the client module 810. Specifically, the image processing module 820 may process one or more images and/or videos of a physical object to extract its size, shape, dimensions, distinguishing qualities (e.g., paint color, scratch, QR code, serial/identification number, or other identifying mark(s)), and a surrounding environment of the physical object.

In some examples, the image processing module 820 may process the images and videos of a physical object to store the extracted information about the physical object within the client device or on a server 830 for future use. In such an instance, the image processing module 820 may create one or more views (e.g., a front view, a side view, a back view) of the physical objects based on captured images and videos of the physical objects from the client module. To enroll a new physical object (e.g., a lock), the module 820 may provide it a unique name, attach the physical object to a known type (e.g., attaching a lock to a bike lock, padlock, gate lock, etc.), and store a date, time, and a place of where the physical object was enrolled. In some examples, while enrolling a new physical object, the module 820 may further store a three-dimensional point cloud as a meta representation of the physical object. A three-dimensional point cloud may be an augmented reality (AR) reference object, where the AR reference object may include collection of high-fidelity spatial mapping data for the physical object. Further, during enrollment of the physical object (e.g., a locking device), the private information (e.g., combination code) may be stored as letters, numbers, or symbols. If a locking device uses non-alphanumeric symbols then images of those symbols may be stored.

In some examples, the image processing module 820 may store a physical object as a three-dimensional object based on the one or more views created from the images and/or videos. In addition, the image processing module 820 may extract and store distinguishing qualities of the physical object that can help further identify the object from similar looking physical objects. For example, if a locking device has a scratch mark on the right side of the device, the image processing module 820 would capture and store such information along with dimensional and other information of the physical device. The image processing module 820 may process and store information about multiple physical objects (e.g., a bike lock, a person, a door lock, and the like).

Alternatively, in some examples, the image processing module 820 may process the images and videos of a physical object in response to a user's request for accessing the physical objects. In such instances, the image processing module 820 may process images and/or videos of a physical object to identify it from the list of physical objects stored on the client device or on the server module 830. To identify the physical object, the image processing module 820 may detect size, shape and other information of objects from the images and compare the information with the stored data of the physical objects. The image processing module 820 may use additional information such as a time of the user's request to identify the physical object. For example, if a user frequently accesses a bike lock in the morning time, the image processing module 820 may determine the locking device to be the bike's lock (from multiple similar looking devices) in response to a user's request to access the bike lock in the morning time. In some examples, the image processing module 820 may update information about a physical object periodically based it's usage. For example, if a user frequency accesses a physical object at a certain time, such information may be stored to help the image processing module 820 with identifying the physical object. In some examples, a user has multiple similar looking locks stored within the system, then the image processing module 820 may identify the lock based on a user's context information and other stored information such as the stored name of the lock, the date when the lock was enrolled, a location of the lock at the time of enrollment and the like. For example, if a user uses similar types of lock both at his front door of the home and at his storage unit, the image processing module 820 may identify the correct lock based on the user's location at the time of receiving the unlocking request from the user. In some examples, if the image processing module 820 cannot identify a single lock from multiple similar looking locks, the image processing module 820 may provide identification for all similar looking locks in response to a user's unlock request.

In some examples, physical objects may have a capability to wirelessly communicate their identifiers or identifying information to a user device (e.g., mobile device) using tags (e.g., AirTag), NFC, Ultra-Wideband (UWB) sensors, Bluetooth, beacons, or other wireless technologies. The identifier or identifying information wirelessly communicated from physical object(s) to the user device may enable the user device to identify the physical object(s) for which the user is trying to retrieve private information. In some examples, the image processing module 820 within a user device may identify a physical object based on the wireless communication and obtain private information for the identified physical object from locally stored data within the user device.

In some examples, physical objects (e.g., locking devices) may be identified based on a location of the user and/or NFC, UWB, Bluetooth, beacons, or other wireless technologies. In such instances, the user is not required to scan the physical objects. For example, a digital assistant (implementing the digital keychain system 800) without an access to camera may receive a user's request "what's the combination of this lock?" In response, the digital assistant may use a combination of the user's location, ultra-wideband technology, Bluetooth, wireless network, or other technology to identify the physical object based on the user's utterance. In the above example, the digital assistant may figure out best match for the terms "this lock." If a user has a combination for a bike lock saved within the digital assistant, the digital assistant may further determine whether the user is near the lock. Accordingly, the digital assistant may obtain the combination for the user after identifying the lock based on a location of the user without requiring specific unlocking request. In addition, the digital assistant may provide predictive unlocking requests to the user. For example, if the user returns to an area where he left his locked bike, an audio or display of "Do you want your bike combination" may be provided to the user. If the user responds "Yes" to the request then the bike combination is provided the user.

In some examples, the digital keychain system 800 includes an authentication module 840. The authentication module 840 may authenticate a user prior to providing private information about a physical object to the user. In some examples, the authentication module 840 may interact with the client module 810 or other modules with a user interface to authenticate the user. In some examples, in response to a user's request for retrieving private information or passcode for one or more physical objects, the authentication module 840 may be invoked by a processor or a module implementing the digital keychain system 800. The authentication module 840 may capture (or interact with another processor to capture), using one or more sensors, biometric input (e.g., fingerprint data, facial recognition data, voice authentication data, retinal scan data) of a user that intends to retrieve private information or passcode for a physical object. The client device implementing the digital keychain system 800 may include one or more biometric sensors, such as motion sensors, proximity sensors, image sensors (such as cameras), microphones, and/or the like to capture the user's biometric input.

In some examples, upon receiving the user's biometric input, the authentication module 840 may authenticate the user. In some examples, the authentication module 840 may interact with the server module 830 to obtain stored authentication data for the authentication process. Alternatively, the authentication data may be stored locally on the client device on a secure enclave or a secure memory area. The authentication module 840 may determine identity of the user based on comparing the biometric input with stored authentication data. For example, a camera may be used to perform facial recognition or a microphone may be used to perform voice recognition to determine the identity of the user with stored authentication data.

In addition, the authentication module 840 may perform an authentication of the user based on biometrics authentication criteria. The criteria may be determined by a user of the digital keychain system 800. The biometrics authentication criteria may define one or more methods (e.g., facial recognition, voice recognition, etc.) and its order for performing authentication. The authentication module 840 may authenticate the user only if the captured biometric data satisfies a biometric authentication criteria. For example, an example criteria may require that the user can only be authenticated with the facial recognition data. Accordingly, the authentication module may not use any other method (e.g., fingerprint data) to authenticate the user if the user's face is not recognized or cannot be recognized because the user's face is obscured by a face covering. In contrast, a different biometric authentication criteria may require a user to provide fingerprint data for authentication data if the facial recognition fails due to a user wearing a face covering. In some examples, if a user is trying to access private information for the physical objects using a wearable device (e.g., a smart watch), a user may not be required to be authenticated to access private information if an authentication was performed for the user to unlock the wearable device and the user has not removed the wearable device from his or her body since the authentication.

In some examples, the authentication module 830 may determine whether the identified user is authorized to access the one or more physical object identified by the image processing module 820. In the above examples, if the user's captured biometric data are validated using the biometrics authentication criteria, then the authentication module 840 may invoke the keychain processing module 850 to further process the user's request for accessing private information of one or more objects.

In some examples, the authentication module 840 may use contextual information associated with the user to authenticate the user. The contextual information may be a time of the request, a location of the user, and any other information that may help verifying the user. In some examples, the authentication module 840 may obtain contextual information from the client module 810 or image processing module 820. For example, if a user always unlocks his or her bike in the morning, a request from the user for unlock in the morning may expedite user's authentication without raising suspicion. In contrast, if the digital keychain system 800 receives unlocking request at 2:00 AM at night, the authentication module 840 may gather additional biometric data to confirm the user's identity. Similarly, if a user is requesting a password for a wireless modem in a house, the authentication module may obtain user's location to verify that the user is actually in the house prior to providing the password to the user.

In some examples, the digital keychain system 800 includes a server module 830. The server module 830 may be an optional module which may be used to process and/or store different sets of data from other modules in the system 800. The digital assistant server 830 may reside on the electronic device or on a remote device with more processing power and resources than the electronic device (e.g., a user device). In some examples, the server 830 may receive and store one or more information about physical objects. In addition, the server 830 may receive and store one or more authentication data for a user. Further, the server module 830 may include additional information such as output format, type of user interface of the user device, user's preference, and other information helpful in providing digital keychain system functionalities to the user. In some examples, the server module 830 may search and consult multiple sources (e.g., Wikipedia, Google Search, etc.) to retrieve information (e.g., a type of locking device) pertaining to the one or more physical objects provided by the image processing module 820. The server module 830 may store such additional information pertaining to the one or more physical objects.

In some examples, the digital keychain system 800 includes a keychain processing module 850. The keychain processing module 850 processes the user's request for accessing private information for one or more physical objects. The keychain processing module 840 may store a set of passcodes or private information on a secure memory area within the client device or the server module 830. In some examples, the digital keychain system 800 may receive one or more outputs from the image processing module 820 and the authentication module 850 prior to processing the user's request for accessing the private information. Specifically, the keychain processing module 850 may receive identification of a physical object from the image processing module 820 and a user's authentication results from the authentication module 840. Upon receiving information about the physical object and authentication results, the keychain processing module 840 may obtain a password or private information for the physical object requested by the user. For example, if the keychain processing module 840 receives positive results about a user being authenticated, the keychain processing module 850 may further process the user's request and obtain passcode or private information for the identified physical objects. The keychain processing module 850 may forward the private information to the keychain display module 860 for presenting the private information to the user over a display of the client device.

Figure 4:
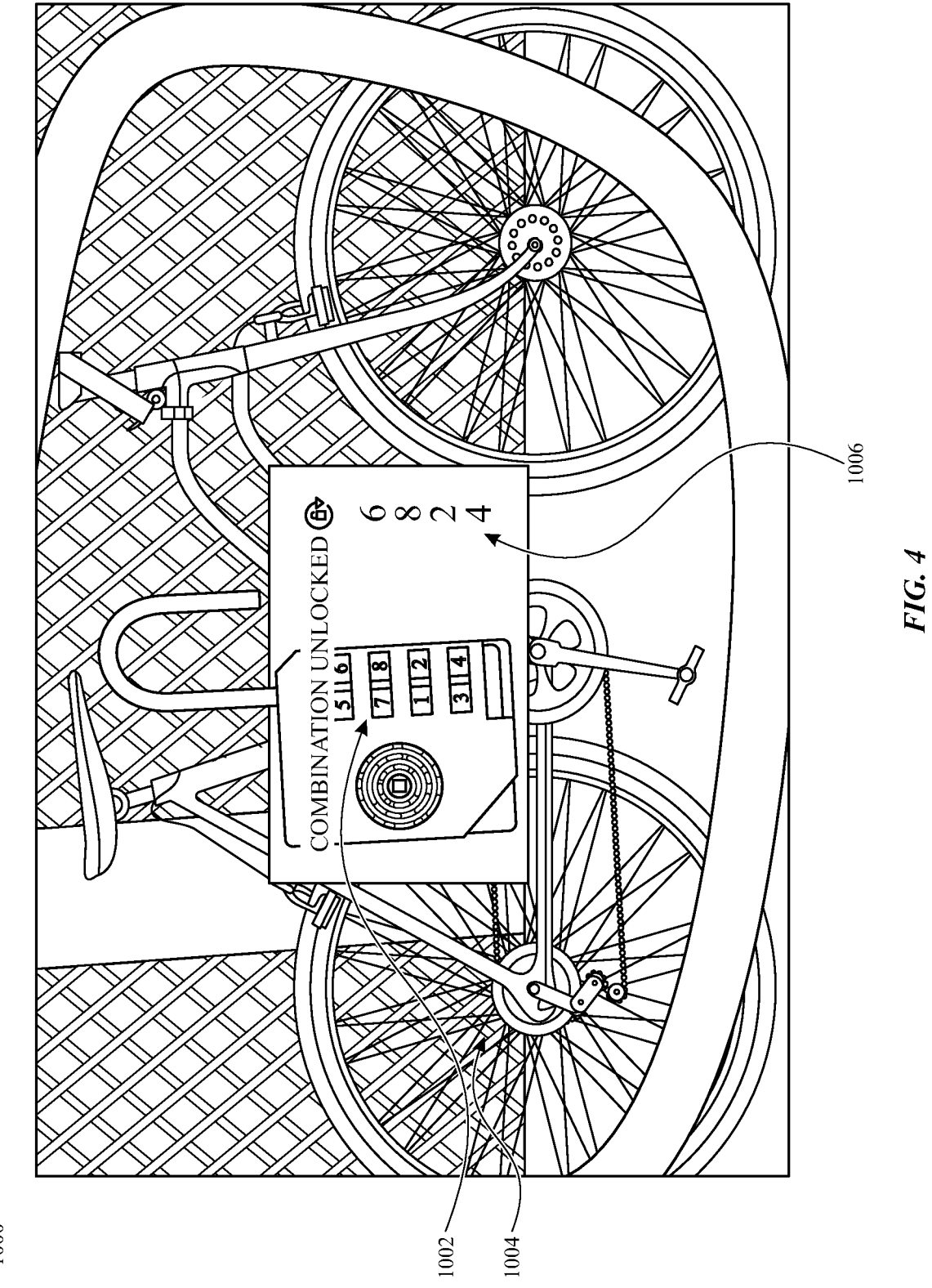
FIG. 4 illustrates an example display of a passcode for a bike lock using a digital keychain system, according to various examples.

In some examples, the digital keychain system 800 may include a keychain display module 860. The keychain display module 860 may generate instructions for presenting private information requested by the user over a user interface, a display, speaker or some other communication medium. The keychain display module 860 may display the private information in different formats based on the user's preference, a device type, type of physical object, and circumstances surrounding the user. In some examples, the keychain display module 860 may provide a graphical presentation of the private information using one or more templates. The one or more templates for graphical presentation may be generated for different device types, a device activity, a type of private information, and the like. For example, if the user is wearing a computer-generated reality headset while trying to retrieve passcode for a bike lock, the template may suggest to show a scaled virtual image of the bike along with the bike lock. Further, a passcode for the bike lock may be displayed in an order that each letter of the code needs to be entered, as shown in FIG. 4.

As discussed in the above examples, the private information may be presented to a user in a format that is easy to follow. Further, the format of graphical presentation may align with geometry and dimensions of the physical object. For example, if a locking device requires a user to enter the combination code in right to left, or left to right or in a different orientation, then the combination code may be presented in a similar orientation. For complex physical objects, such as safes with a circular mechanism, the graphical presentation may inform the user with left to right or right to left direction. In some examples, for a known certified product (e.g., known type of safe), a template for presenting unlocking information may be used for better user experience. For example, based on a template for a known safe, the graphical presentation of unlocking instruction may include visually walking the user through the unlocking of the safe. Specifically, the graphical presentation may show the user which way to turn and how far to turn and provide step by step unlocking instructions to the user. In some instances, the digital keychain may provide instruction for next step only after receiving confirmation from the user about completing the previous step.

In another example, if a user is trying to retrieve private information on a handheld device, a different template may be used for presenting the private information to the user within available display space on the handheld device. In another example, if a user is requesting private information on a handheld device while performing another activity on a handheld device (e.g., talking on phone or video call), the keychain display module 860 may present the private information in a scaled down user interface on the handheld device. In some examples, a different template may be used for presenting the private information based on a type of physical object. For example, if a physical object is a person then private information (e.g., phone number, address, etc.) of the person may be shown in a different format (e.g., a user interface with a picture of person and private information following the picture) than if the physical object is a locking device. In some examples, the keychain display module 860 may include a template for determining virtual objects and configuration of the virtual objects for providing display of private information to a user. In some examples, each of the one or more virtual objects is a Graphical User Interface (GUI) component in a virtual three-dimensional space.

In the above examples, the electronic device may display one or more virtual objects or animation of the virtual objects representing the physical objects and the private information within a user's background environment on a user interface of the client device. Further, the one or more virtual objects are scaled based on a size associated with at least one object in the background environment and a real scale of the physical object. For example, if a wall is displayed in the background of a safe (a physical object), the keychain display module 860 may display scaled virtual objects presenting a wall, a safe, and a locking device on a safe on the client device based on the geometry of the background environment.

In some examples, the keychain display module 860 may determine which communication medium to choose for presenting the private information based on circumstances surrounding the user. For example, if a user is requesting private information on a handheld device in a noisy environment, the keychain display module 860 may choose to present the private information on a user interface of the phone screen instead of speaking the private information on a speaker.

Figure 3:
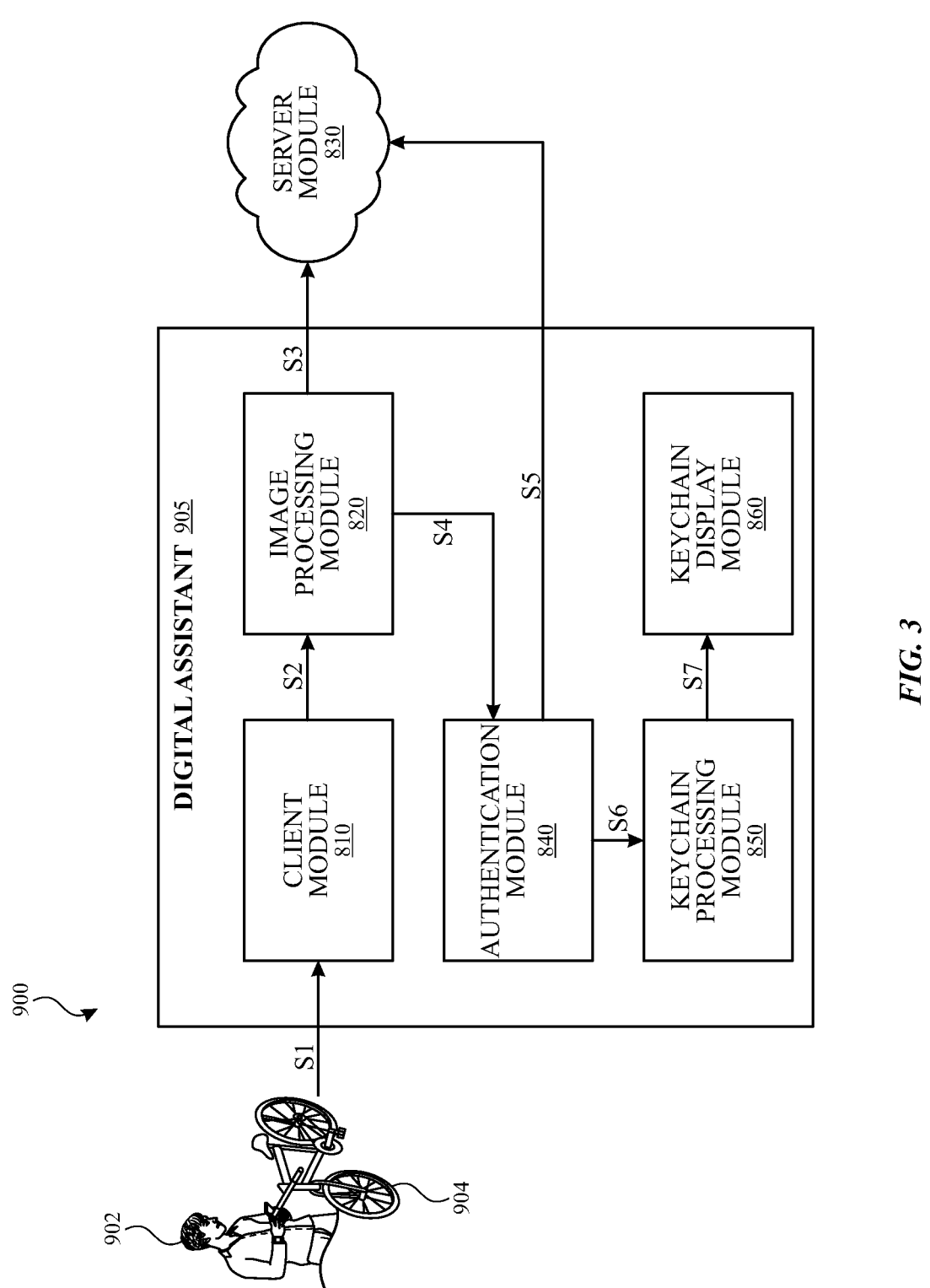
FIG. 3 illustrates a system for providing private information of physical objects using a digital keychain system, according to various examples.

FIG. 3 illustrates a system for providing private information of physical objects using a digital keychain system, according to various examples. The system 900 illustrates steps for retrieving private information of physical objects in response to a user trying to access one or more physical objects. As shown in FIG. 3, the digital keychain system 800 may be implemented within a digital assistant 905 or a software application within a client device. Accordingly, in one implementation, the modules 810, 820, 840, 850, and 860 are implemented within a client device implementing the digital assistant 905 and module 830 may be implemented on a remote server supporting the digital assistant 905. Alternatively, all modules of system 800 are implemented on the client device. In an example embodiment, as shown in FIG. 3, a user 902 may request the digital keychain system 800 to get passcode for a combination bike lock 904 to unlock the bike lock. The user 902 may obtain the combination code for the bike lock using at least one of steps S1-S7.

In step S1, a user 902 may request the client module 810 of the digital assistant 905 or a software application implementing the digital keychain system 800 for the unlocking instruction for a physical object (e.g., bike lock 904). The user 902 may request the digital assistant 905 in many ways and formats. In some examples, a user may provide a written request for unlocking instruction for a physical object where the request may include one or more images or video of the physical object (e.g., bike lock 904). Alternatively, the user 902 may provide a user request in the form of a speech input to the client module 810. For example, the user 902 may provide a command "Hey Digital Assistant, what is the passcode for my bike lock" after clicking on an icon for a digital assistant or an icon of a software application. In response, the client module 810 may request the user to capture a picture or video of the bike lock. In response, the client module 810 may capture two-dimensional or three-dimensional pictures and/or videos of physical or real-world objects (e.g., a bike lock 904). The client module 810 may trigger one or more capturing devices (e.g., camera) to capture pictures and/or videos of the physical object.

In step S2, the client module 810 may forward the user's inputs including pictures and/or videos of a physical object to the image processing module 820. Specifically, the client module 810 may forward images and/or videos of physical objects captured by the capturing device (e.g., camera) to the image processing module 820. For example, to process a user's request for the passcode of bike lock 904, the client module may forward photographs or video of the bike lock 904 to the image processing module 820. In addition, the client module 810 may forward additional information such as the user's request and contextual information associated with the user's request. For example, for retrieving passcode for the bike lock 904, the client module 810 may forward pictures of the bike lock 904, a time of the user's request, a location of the user's device, and similar information to the image processing module 820.

In response to receiving the user's inputs and contextual information, the image processing module 820 may process captured data (e.g., images and/or videos) of physical objects from the client module 810. To process the user's request, the image processing module 820 may create one or more views of the physical objects based on captured images and videos of the physical objects to extract its size, shape, dimensions, distinguishing qualities of the physical object (e.g., RFID, model number, etc.), and a surrounding environment (e.g., time of a user's request) of the physical object. The image processing module 820 may compare the extracted information with information from a list of physical objects on the client device or on a server module 830.

In step S3, the image processing module 820 may obtain a list of registered physical objects and information about them from the module server 830 for identifying the physical object. Alternatively, the image processing module 820 may send extracted information of the physical object to the server module 830 and in response, receive the identity of the physical object from the server module 830. In some examples, the image processing module 820 may have the information about registered physical objects on a local memory associated with the client device. Accordingly, in such instance, the image processing module 820 does not interact with the remote server module 830 or obtain any data from the server module 830 under step S3.

In some examples, in response to a user's request for accessing a physical object, the image processing module 820 may process images and/or videos of the physical object to identify it from the list of physical objects stored on the client device or on the server module 830. To identify the physical object, the image processing module 820 may compare the extracted size, shape, dimension, and other information of objects from the images with the stored data of the physical objects. The image processing module 820 may use additional information such as a time of the user's request to identify the physical object. For example, if a user frequently tries to access a bike lock 904 every morning and in response to a user's request to unlock a locking device, the image processing module 820 may determine the locking device to be the bike lock 904 if the system has two similar looking locking devices stored.

In step S4, the image processing module 820 may forward an identity of a physical object to the authentication module 840 to further process the user's request. In some examples, in step S4, the image processing module 820 may send additional data or contextual information (e.g., a user's location or time of the request) or all information associated with the user's request to the authentication module 840 along with the identity of the physical object. Alternatively, the image processing module 820 may trigger the authentication module 840 to further process the user's request and send the identity of the physical object to the keychain processing module 850 in step S4. In another implementation, under step S4, the image processing module 820 may forward the identity of the physical object to the keychain processing module 850, and in response, the keychain processing module 850 may trigger the authentication module to authenticate the user 902. In another implementation, if the image processing module 820 is not able to identify the physical objects based on the stored physical objects, the module 820 may trigger the client module 810 to display an error message (e.g., "Locking device not found") on a display associated with the digital assistant 905.

In the above examples, in response to receiving the identity of the physical object and a user requesting information at the authentication module 840, the authentication module 840 may trigger the authentication process for the user. The authentication module 840 may use one or more authentication mechanisms to capture a user's biometric data and authenticate the user. The authentication module 840 may capture, using one or more sensors, biometric input (e.g., fingerprint data, facial recognition data, voice authentication data, retinal scan data) of a user that intends to retrieve private information for physical objects. The device implementing the digital keychain system 800 may include one or more biometric sensors, such as motion sensors, proximity sensors, image sensors (such as cameras), microphones, and/or the like to capture a user's biometric input. In the above example, the authentication module 840 may enable image sensors to capture the user's face to authenticate the user for receiving passcode for the bike lock 904. In some examples, multiple authentication mechanisms may be required to authenticate the user. For example, the authentication module 840 may require a user's facial recognition data as well as fingerprint data to authenticate the user. As described in FIG. 2, the authentication may be performed based on a configured authentication criteria (e.g., use multiple authentication mechanisms) for a user. In the above examples, the authentication module 840 may use the contextual information received under step S4 for authenticating the user. For example, the authentication module 840 may analyze contextual information such as a time of request with user's historical behavior to further verify the user's identity.

In step S5, the authentication module 840 may interact with server module 830 to obtain certain information such as authentication data for authorized users, historical access information, and the like to authenticate the user. In addition, the authentication module 840 may interact with server module 830 to get authentication for the user 902 from other remote devices and/or other users. The server module 830 may obtain access permission for the user 902 from other devices or users in response to a user's request. For example, a first user and a second user may both have the digital keychain system 800 integrated within their devices. The first user may request the server module 830 to obtain access permission from the second user for accessing code for the bike lock 904. The permission from the second user may be obtained and stored by the server module 830. Accordingly, the authentication module 840 may use the authentication data, contextual information, and other information from the server module 830 to authenticate the user. Alternatively, the authentication data, contextual information, and other information may be stored locally within the client device. In such an instance, step S5 is not performed.

In step S6, the authentication module 840 may provide results of authentication to the keychain processing module 850. The keychain processing module 850 further processes the user's request for accessing private information for one or more physical objects. In some examples, if a user has been authenticated within the module 840, the keychain processing module 840 may obtain private information for the physical object. The keychain processing module 840 may obtain the passcode or private information from the secure memory area within the client device or the server module 830. In some examples, if the authentication module 840 determines that the user does not have permission to access the private information or passcode, the failed authentication results are further sent to the keychain processing module 850 in step S6. In response to receiving the failed authentication, the keychain processing module 850 may trigger the client module 810 to display an error message (e.g., "the user is not authorized") on a display associated with the digital assistant 905.

In some examples, in step S6, the digital keychain system 800 may receive both outputs from the image processing module 820 (received at the authentication module 840 in step S4) and the authentication module 840. The keychain processing module 840 may process a user's request for accessing one or more physical objects based on results or outputs from the image processing module 820 and the authentication module 840. Specifically, the keychain processing module 850 may receive physical object identification from the image processing module 820 and a user's authentication results from the authentication module 840. Upon receiving information about the physical object and authentication results, the keychain processing module 840 may obtain private information for the physical objects. For example, if the bike lock 904 is identified based on results from the image processing module 820 and the user 902 is authorized to access the bike lock combination based on results from the authentication module 840, the keychain processing module 840 obtains the combination passcode for the bike lock 904 from local device storage or server module 830.

In step S7, the keychain processing module 850 may forward the private information to the keychain display module 860 for providing the private information to the user. The keychain display module 860 may generate instructions for presenting private information requested by the user over a user interface, a display, speaker or some other output device. The keychain display module 860 may display the private information in different formats based on the user's preference, a device type, a type of physical object, and circumstances surrounding the user. In some examples, the keychain display module 860 may provide a graphical presentation of the private information using one or more templates. For example, if the user is wearing a computer-generated reality headset while trying to retrieve passcode for the bike lock 904, the template may suggest to show a scaled virtual image of the bike along with the bike lock 904. Further, a passcode for the bike lock 904 may be displayed in an order that each letter of the code needs to be entered, as shown in FIG. 4.

In some examples, different combinations and orders of steps S1 to S7 may be used to register a physical object for the user. Specifically, a user may invoke a physical object registration by clicking on a registration icon on an application or a digital assistant implementing the digital keychain system 800. To register the physical object, the client module 810 may request a user to capture one or more pictures and/or videos of the physical object. Upon capturing the pictures and/or videos, the client module 810 may forward the pictures and/or videos to the image capturing module 820. The image processing module 820 may extract information (e.g., dimensions) about the physical objects, create different views of the physical object based on the extracted information, and store the views and information within the client device or on a server 830 for future use. In some examples, the image processing module 820 may create one or more views (e.g., a front view, a side view, a back view) of the physical objects and store a physical object as a three-dimensional virtual object based on the one or more views. In addition, the image processing module 820 may extract and store distinguishing qualities of the physical object that can help further identify the object from similar looking physical objects. The client module 810 may be further invoked to retrieve the private information for the physical object from the user. After receiving the private information or passcode from the user, the client module 810 (and/or the image processing module 820) may forward the identification of the stored physical object and the private information to the keychain processing module 850. The keychain processing module 850 may store the mapping between the physical object and private information within a secure enclave on the client device or on the server module 830.

In some examples, the private information for the physical objects may be shared with a group of users on their respective electronic devices. In some examples, a client module 810 may provide a user interface to enable the user to share private information for one or more physical objects with other users. The user may share lock access with anyone or everyone within a secure sharing group. In some examples, the client module 810 may send an encrypted share link over messages to share the private information for the physical objects with other user(s).

In an example embodiment, the digital keychain system 800 (or functionality of system 800) may be implemented by a mobile device. In some examples, a user may point his or her mobile device (with a camera turned on) at a locking device. The user may further invoke a digital assistant and provide a speech request (e.g., "OK assistant, What's the combination?") for obtaining combination of the locking device. In response, the mobile device may authenticate user using one or more authentication methods discussed in FIG. 2 description. The mobile device may further identify the locks using methods discussed in FIGS. 2 and 3 descriptions. The mobile device may further obtain the password or combination for the locking device and display it in an augmented overlay over the mobile device.

In an another embodiment, the digital keychain system 800 (or functionality of system 800) may be implemented an augmented reality glasses or virtual reality headset. In some examples, a user may look at the lock wearing a augmented reality glasses or virtual reality glasses (as shown in FIG. 5B). The user may invoke a digital assistant (or a processor) associated with the AR or VR headset and identify the lock. The AR or VR headset may further authenticate the user using one or more authentication methods. The headset may further determine that the user wants to see a passcode for the lock based on gaze direction of the user's eyes. Accordingly, the AR or VR headset may display the passcode in an augmented overlay.

In an example embodiment, the digital keychain system 800 (or functionality of system 800) may be implemented by a mobile device. In some examples, a user may tap back of the mobile device to a locking device and detects a lock identification via NFC (Near-Field Communication). The mobile device may then verify the user's identity by using authentication methods, pull password or combination for the locking device, and display the passcode on screen with an animation for the locking device using modules disclosed in FIG. 2.

FIG. 4 illustrates an example display of passcode for a bike lock using a digital keychain system, according to various examples. As discussed in the FIG. 3 description, the private information of the locking device may be presented on a display of the client device in response performing steps S1-S7. Specifically, in response to a user's request to retrieve private information for a physical object, the private information for the one or more objects may be provided to the user in different formats based on a user specific criteria, a device type, a type of physical objects, and circumstances surrounding the user.

In an example embodiment, as shown in FIG. 4, a user may request unlocking instruction for the bike lock attached to the bike 1004. A user may request by clicking a picture of the bike lock within a digital assistant interface implementing the digital keychain system 800. Alternatively, a user may request unlocking instruction for the bike lock attached to the bike 1004 using speech input to the digital assistant (e.g., Hey Digital Assistant, what is combination of my bike lock?). Alternatively, a request for bike lock combination may be provided by the digital assistant upon detecting a location of the user device close to the bike.

In response, the combination code for the bike lock may be provided to a user using a specific display template. As shown in FIG. 4, in response to a request for unlocking instruction for the bike lock, display 1000 may be presented to the user on a user interface or a display associated with the digital assistant. The display 1000 may include a scaled virtual image of the bike 1004, scaled virtual image of the bike lock 1002, and passcode 1006 for unlocking the bike lock embedded to the virtual image of the bike lock 1002. The display 1000 may be generated based on images and/or video captured and/or stored by the digital keychain system 800 and templates for presenting the unlocking instruction. A specific template from a list of templates may be used for providing the graphical presentation, as shown in FIG. 4, of the combination code to the user. For example, to provide unlocking instruction for a combination lock 1002, the digital keychain system 800 (or a module within the system 800) may identify a template based on the type of lock, a type of physical object, and other information about the bike lock and the user. Here, a template specific to a traditional combination lock showing four horizontal key entries with a passcode 1006 next to each of the combination entry to provide step by step unlocking instruction to the user. For example, the virtual code entry pad 1002 is displayed horizontally to match the actual keypad for the combination lock of the bike. In some examples, a template for a physical object simply requires to display a passcode within a scaled up version of the locking device.

In the above example, if the user device is a handheld device instead of the virtual reality headset, the graphical presentation of the unlocking instruction and the passcode within a virtual image of a physical object may be scaled down to fit into the handheld device. In some examples, different templates may be used to show the graphical presentations on different device types (e.g., mobile device, virtual reality headset, etc.).

Figure 5A:
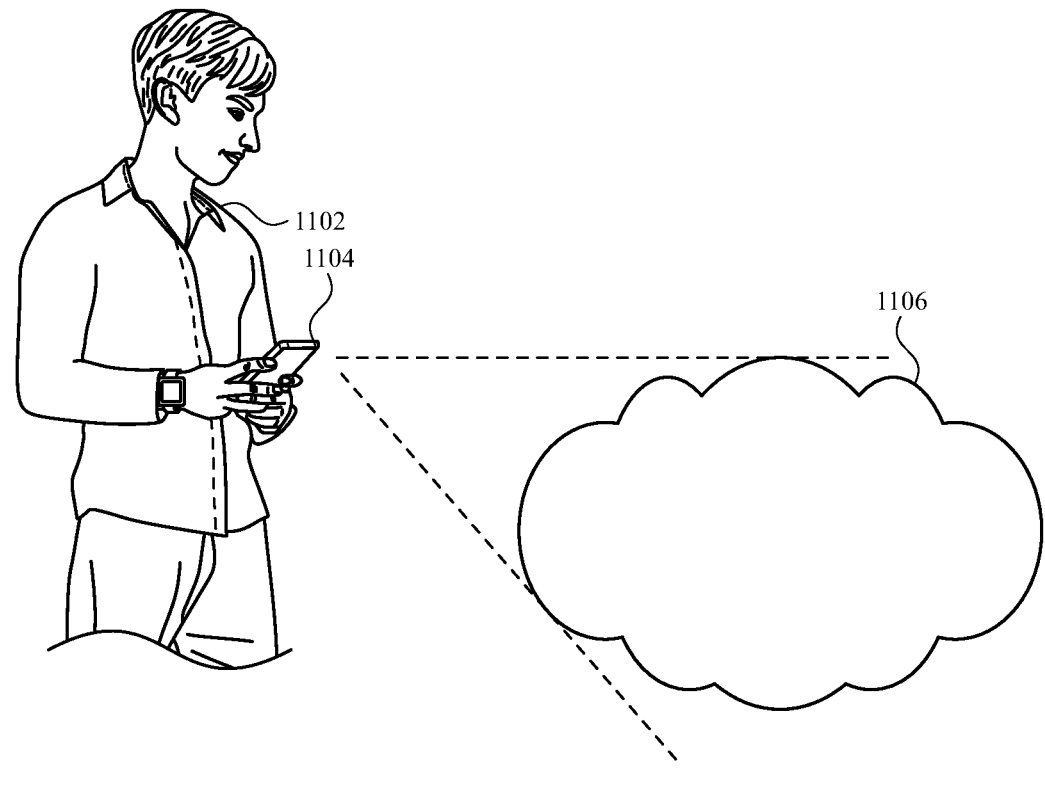
FIG. 5A illustrates an example use of a digital keychain system for physical objects on a handheld device, according to various examples.
Figure 5B:
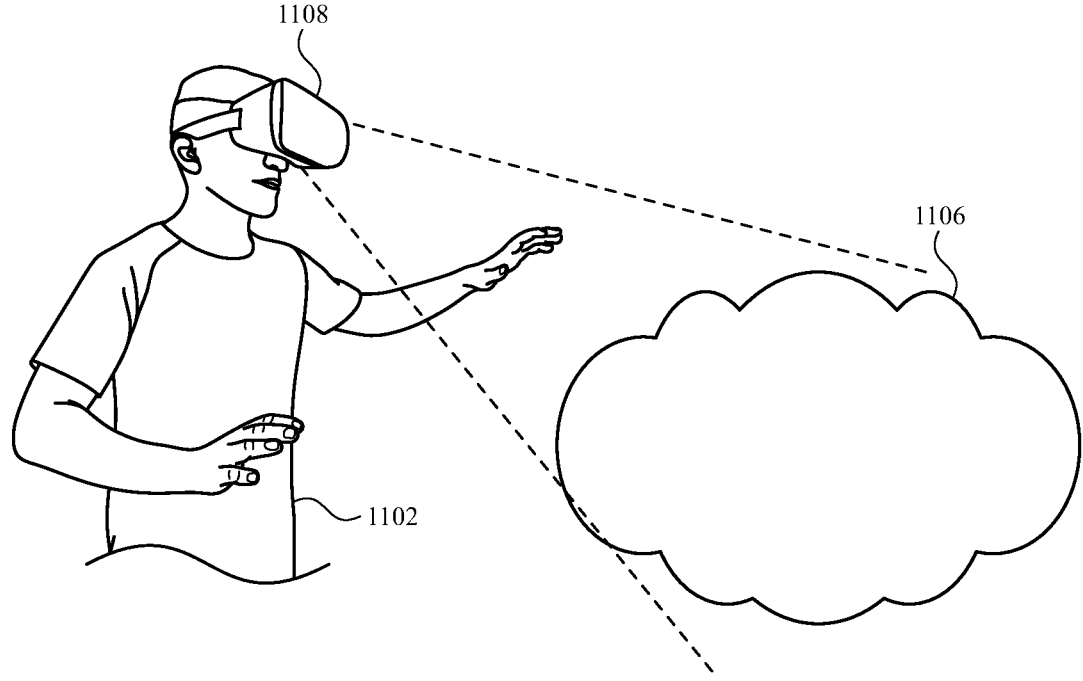
FIG. 5B illustrates an example use of a digital keychain system for physical objects on a computer-generated reality headset, according to various examples.

FIG. 5A illustrates an example use of a digital keychain system for physical objects on a handheld device, according to various examples. In some examples, the digital keychain system 800 may be used to store and manage secure information for any physical object 1106 (e.g., bike lock, door lock, keypad lock, person, etc.). The digital keychain system 800 implemented on a user's handheld device 1104 (e.g. mobile phone), a user 1102 may request to store and manage information on any type of physical object 1106 in a real-world environment. For example, as discussed in FIGS. 3 and 4, a user 1102 may store and manage secure or private information about a locking device (e.g., bike lock, keypad locker, etc.) using the digital keychain system implemented on the user's handheld device 1104. In some examples, a user 1102 may store and manage private information for a physical object such as a wireless modem, a router, a computer, or other type of devices that can be accessed online with a certain unlocking code or password. For example, a user may retrieve password for a wireless network by scanning a wireless modem in a home with his handheld device 1104. In some examples, a user 1102 may store and manage private information for a physical object 1106 such as a person. For example, a user 1102 may store and manage private information (e.g., phone number, address, etc.) of a person, and retrieve the private information of the person in response to scanning a person from a user's handheld device 1104. Alternatively, a user may retrieve the private information of the person in response to providing a speech input to the digital assistant (e.g., "Hey Digital Assistant, what is birthday of my son?").

As discussed in FIGS. 3 and 4 descriptions, private information of a physical object 1106 may be presented to the user 1102 on the handheld device 1104 based on the type of the device. For example, as shown in FIG. 5A, for a user 1102 with a handheld device 1104, private information for a physical object 1106 may be provided to the user over a user interface that may cover a portion of display of the handheld device 1104 using one or more display templates for the handheld device.

FIG. 5B illustrates an example use of a digital keychain system for physical objects on a computer-generated reality headset, according to various examples. In some examples, the digital keychain 800 may be used to store and manage secure information for any physical object 1106 viewed by a user 1102 on the user's computer-generated reality headset 1108. A computer-generated reality headset 1108 may be an augmented reality glasses (AR glasses) or a virtual reality headset (VR headset). In some examples, a user 1102 may store and manage secure or private information about a person using the digital keychain system 800 implemented on the user's headset 1108 using steps S1-S7. For example, a user may store and manage private information (e.g., social security number) of a person (object 1106), and retrieve the private information of the person in response when the user 1102 looks at the person wearing the headset 1108. In an example embodiment, a user 1102 may store private information (e.g., social security, insurance information, date of birth, etc.) about his or her child (object 1106) on the digital keychain system 800 implemented on the computer-generated reality headset or glasses 1108. Accordingly, if a user 1102 is at doctor's office with his or her child (object 1106), the user 1102 may look at his or her child (object 1106) and trigger the digital keychain system 800 in order to view the child's social security, insurance information, and other private information on a virtual display of the headset 1108. For example, as shown in FIG. 5B, for a user with a computer-generated reality headset 1108, private information for a physical object may be provided to the user over a user interface that may cover a portion of display of the computer-generated reality headset 1108 using one or more display templates for the computer-generated reality headset 1108.

3. Processes for Providing Private Information For Physical Objects

FIG. 6 illustrates a process for providing private information for physical objects, according to various examples. Process 1200 is performed, for example, using one or more electronic devices implementing a digital assistant or a software application for digital keychain system 800. In some examples, one or more blocks of process 1200 are performed by one or more remote devices (e.g., one or more remote servers, one or more local servers, a cloud computing system, and/or the like). Alternatively, the one or more blocks of process 1200 are performed by the one or more client electronic devices implementing a digital assistant or a software application. For example, the blocks of process 1200 are divided up in any manner between one or more servers (e.g., DA server 830) and a client device. Thus, while portions of process 1200 are described herein as being performed by particular devices, it will be appreciated that process 1200 is not so limited. In another example, the process 1200 is performed using only a client device or multiple client devices. In process 1200, some blocks are, optionally, combined, the order of some blocks is, optionally, changed, and some blocks are, client devices, optionally, omitted. In some examples, additional steps may be performed in combination with the process 1200.

In some examples, the electronic device (e.g., a personal or client electronic device (e.g., a mobile device, a tablet computer, a smart watch, a desktop, or a laptop) or a communal electronic device (e.g., a smart TV, virtual reality headset (e.g., VR headset), or a smart speaker)) may be connected to a communications network (e.g., local area networks (LAN) or wide area networks (WAN), e.g., the Internet). The electronic device may include a display which may provide an input interface and an output interface between the electronic device and a user. The input interface may be an icon of a digital assistant or a software application for a user to provide user requests.

In some examples, at block 1202, an electronic device (a client module or a processor of the electronic device) receives a user request. The user request may be to scan one or more objects in a real-world environment for obtaining private information for the one or more objects (discussed in step S1 of FIG. 3). In some examples, the electronic device (e.g., client module 810) may scan one or more objects within a real-world environment using a real-time capturing device associated with the electronic device in response to the user request. In the above examples, the real-world environment is a surrounding environment of the user providing the user request. In the above examples, one of the one or more objects is a locking device or a physical object (e.g., bike lock, door lock, keypad lock, a person, etc.).

In the above examples, in response to receiving the user request, steps 1204, 1206, 1208, 1210, and 1212 are performed by one or more processors associated with the electronic device.

In some examples, at block 1204, the electronic device (e.g., image processing module 820) may generate one or more views of the one or more objects. In some examples, each of the one or more views is at least one of three-dimensional or two-dimensional images or videos of the one or more objects. To generate the one or more views, the electronic device (or a processor of the electronic device or image processing module 820) may perform techniques described in FIG. 2 and FIG. 3 (step S2) descriptions.

In some examples, at block 1206, the electronic device may identify at least one of the one or more objects as a locking device from a list of stored objects based on the one or more views of the objects (using techniques discussed in step S2 of FIG. 3). In the above examples, identifying at least one of the one or more objects to be the locking device based on the one or more views includes: determining at least one of shapes, sizes, and dimensions of the one or more objects based on the one or more views and matching the at least one of the shapes sizes, and dimensions of the one or more objects with object information to identify at least one object to be a locking device. The object information may be stored on a secure memory area within the electronic device or a remote server, as discussed in FIGS. 2 and 3 descriptions.

In some examples, at block 1208, the electronic device may authenticate the user based on biometric data and contextual information to further process the user request. In some examples, the electronic device (e.g., authentication module 840) authenticating the user based on biometric data may obtain the biometrics data associated with the user using a predetermined authentication method and validate an identity of the user by matching the biometric data with authentication data for the user. In some examples, the contextual information includes at least one information about the user, information about the electronic device, or information about circumstances surrounding the user's request. In some examples, the biometric data of the user includes fingerprint data, facial identification data, voice data, or eye scan data.

In some examples, at block 1210, the electronic device may obtain instructions for unlocking the locking device in response to authenticating the user. The instructions for unlocking the locking device may include at least one of an unlock code, password, combination code, or information for unlocking the locking device. In some examples, the one or more objects may be a physical object such as a person. Accordingly, for a physical object that is a person, the electronic device (e.g., keychain processing module 840), at block 1210, may obtain instruction for providing private information for the person to the user.

In some examples, at block 1212, the electronic device may provide the obtained instructions to the user. The electronic device (e.g., keychain display module 860) provides the instruction to the user by creating an animation involving the instructions and the one or more objects and presenting the animation on a user interface within the electronic device. In some examples, the electronic device may determine a communication's medium associated with the electronic device for providing instructions to the user and then provide the instructions to the user using the determined communication. The communication's medium may be at least one of a display screen on the electronic device, speaker of the electronic device, a virtual reality display, and an augmented reality display associated with the electronic device. In some examples, a display of each of the one or more virtual objects or animation of the instructions is presented with a virtual background of the physical objects and instructions for the objects.

In some examples, the visual representation of the response may be presented based on a state of the user or activities on the electronic device. For example, if a user request is provided while the user is talking on the phone, the response may be provided to the user on a portion of a screen in a condensed form together with the phone application or over the phone application. Alternatively, other content or applications open and displayed on the user device may be closed to allow visual representation of the response. Alternatively, in response to obtaining instructions for unlocking the locking device, the electronic device (or a processor associated with the electronic device) may unlock the locking device remotely using the instructions.

The operations described above with reference to FIGS. 4-6 are optionally implemented by components depicted in FIGS. 1A, 1B, 2, and 3. For example, the operations of process 1200 may be implemented by system 700 or 800. It would be clear to a person having ordinary skill in the art how other processes are implemented based on the components depicted in FIGS. 1A, 1B, 2, and 3.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to quickly provide access to desired set of actions to a user viewing or browsing content on an electronic device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver accurate responses to requests that are of greater interest to the user. Accordingly, use of such personal information data enables users calculated control of response resolution. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the providing visual representation of snippets, the present technology can be configured to allow users to select to "opt in" or "opt out" of participation in the collection of personal information data during registration for services or anytime thereafter. In another example, users can select not to provide access to their location information or contacts information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various examples of the present technology are not rendered inoperable due to the lack of all or a portion of such personal information data. For example, For example, sensors can be enabled by inferring preferences based on non-personal information data or a bare minimum amount of personal information, such as non-personal information available to the digital assistant, or publicly available information.

What is claimed is:

1. An electronic device comprising:
one or more processors;
a memory; and
one or more programs, wherein the one or more programs are stored in the memory and configured to be executed by the one or more processors, the one or more programs including instructions for:
scanning one or more objects within a real-world environment using a real-time capturing device associated with the electronic device in response to receiving a user request;
generating one or more views of the one or more objects;
identifying at least one of the one or more objects as a locking device based on the one or more views;
authenticating the user based on biometric data and contextual information;
obtaining instructions for unlocking the locking device in response to authenticating the user; and
providing the instructions to the user.

2. The electronic device of claim 1, wherein the user request is to scan the one or more objects in the real-world environment for obtaining instructions for unlocking the one or more objects.

3. The electronic device of claim 1, wherein each of the one or more views is at least one of three-dimensional or two-dimensional images or videos of the one or more objects.

4. The electronic device of claim 1, wherein identifying at least one of the one or more objects to be the locking device based on the one or more views comprises:
determining at least one of shapes, sizes, and dimensions of the one or more objects based on the one or more views; and
matching the at least one of the shapes sizes, and dimensions of the one or more objects with object information to identify at least one object to be the locking device.

5. The electronic device of claim 4, wherein the object information is stored on a secure memory area within the electronic device or a remote server.

6. The electronic device of claim 1, wherein authenticating the user based on the biometric data comprises:
obtaining the biometric data associated with the user using a predetermined authentication method; and validating an identity of the user by matching the biometric data with authentication data for the user.

7. The electronic device of claim 1, wherein the instructions for unlocking the locking device includes at least one of an unlock code, password, combination code, or one or more steps for unlocking the locking device.

8. The electronic device of claim 1, wherein the one or more programs further include instructions for:
determining a communication's medium associated with the electronic device for providing instructions to the user; and
providing the instructions to the user using the determined communication.

9. The electronic device of claim 8, wherein the communication's medium is at least one of a display screen on the electronic device, speaker of the electronic device, a virtual reality display, and an augmented reality display associated with the electronic device.

10. The electronic device of claim 1, wherein the real-world environment is a surrounding environment of the user providing the user request.

11. The electronic device of claim 1, wherein the contextual information includes at least one information about the user, information about the electronic device, or information about circumstances surrounding the user request.

12. The electronic device of claim 1, wherein providing the instructions to the user comprises:
creating an animation involving the instructions and the one or more objects; and
presenting the animation on a user interface within the electronic device.

13. The electronic device of claim 1, wherein at least one of the one or more objects is a locking device or a physical object surrounding the locking device.

14. The electronic device of claim 1, wherein the biometric data of the user includes at least one of fingerprint data, facial identification data, voice data, or eye scan data.

15. The electronic device of claim 1, wherein the one or more programs further include instructions for:
in response to obtaining instructions for unlocking the locking device:
unlocking the locking device remotely using the instructions.

16. The electronic device of claim 1, wherein the one or more programs further include instructions for:
in response to scanning the one or more objects:
identifying at least one of the one or more objects;
authenticating the user based on biometric data and contextual information;
obtaining private information for the at least one object in response to authenticating the user; and
providing the private information to the user.

17. A method performed on an electronic device, the method comprising:
scanning one or more objects within a real-world environment using a real-time capturing device associated with the electronic device in response to receiving a user request;
generating one or more views of the one or more objects;
identifying at least one of the one or more objects as a locking device based on the one or more views;
authenticating the user based on biometric data and contextual information;
obtaining instructions for unlocking the locking device in response to authenticating the user; and
providing the instructions to the user.

18. A non-transitory computer-readable storage medium storing one or more programs, the one or more programs comprising instructions, which when executed by one or more processors of an electronic device, cause the electronic device to:

scan one or more objects within a real-world environment using a real-time capturing device associated with the electronic device in response to receiving a user request;

generate one or more views of the one or more objects;

identify at least one of the one or more objects as a locking device based on the one or more views;

authenticate the user based on biometric data and contextual information;

obtain instructions for unlocking the locking device in response to authenticating the user; and provide the instructions to the user.

19. The method of claim 17, wherein the user request is to scan the one or more objects in the real-world environment for obtaining instructions for unlocking the one or more objects.

20. The method of claim 17, wherein each of the one or more views is at least one of three-dimensional or two-dimensional images or videos of the one or more objects.

21. The method of claim 17, wherein identifying at least one of the one or more objects to be the locking device based on the one or more views comprises:

determining at least one of shapes, sizes, and dimensions of the one or more objects based on the one or more views; and matching the at least one of the shapes sizes, and dimensions of the one or more objects with object information to identify at least one object to be the locking device.

22. The method of claim 21, wherein the object information is stored on a secure memory area within the electronic device or a remote server.

23. The method of claim 17, wherein authenticating the user based on the biometric data comprises:

obtaining the biometric data associated with the user using a predetermined authentication method; and validating an identity of the user by matching the biometric data with authentication data for the user.

24. The method of claim 17, wherein the instructions for unlocking the locking device includes at least one of an unlock code, password, combination code, or one or more steps for unlocking the locking device.

25. The method of claim 17, further comprising:

determining a communication's medium associated with the electronic device for providing instructions to the user; and providing the instructions to the user using the determined communication.

26. The method of claim 25, wherein the communication's medium is at least one of a display screen on the electronic device, speaker of the electronic device, a virtual reality display, and an augmented reality display associated with the electronic device.

27. The method of claim 17, wherein the real-world environment is a surrounding environment of the user providing the user request.

28. The method of claim 17, wherein the contextual information includes at least one information about the user, information about the electronic device, or information about circumstances surrounding the user request.

29. The method of claim 17, wherein providing the instructions to the user comprises:

creating an animation involving the instructions and the one or more objects; and presenting the animation on a user interface within the electronic device.

30. The method of claim 17, wherein at least one of the one or more objects is a locking device or a physical object surrounding the locking device.

31. The method of claim 17, wherein the biometric data of the user includes at least one of fingerprint data, facial identification data, voice data, or eye scan data.

32. The method of claim 17, further comprising:

in response to obtaining instructions for unlocking the locking device:

unlocking the locking device remotely using the instructions.

33. The method of claim 17, further comprising:

in response to scanning the one or more objects:

identifying at least one of the one or more objects;

authenticating the user based on biometric data and contextual information;

obtaining private information for the at least one object in response to authenticating the user; and providing the private information to the user.

34. The non-transitory computer-readable storage medium of claim 18, wherein the user request is to scan the one or more objects in the real-world environment for obtaining instructions for unlocking the one or more objects.

35. The non-transitory computer-readable storage medium of claim 18, wherein each of the one or more views is at least one of three-dimensional or two-dimensional images or videos of the one or more objects.

36. The non-transitory computer-readable storage medium of claim 18, wherein identifying at least one of the one or more objects to be the locking device based on the one or more views comprises:

determining at least one of shapes, sizes, and dimensions of the one or more objects based on the one or more views; and matching the at least one of the shapes sizes, and dimensions of the one or more objects with object information to identify at least one object to be the locking device.

37. The non-transitory computer-readable storage medium of claim 36, wherein the object information is stored on a secure memory area within the electronic device or a remote server.

38. The non-transitory computer-readable storage medium of claim 18, wherein authenticating the user based on the biometric data comprises:

obtaining the biometric data associated with the user using a predetermined authentication method; and validating an identity of the user by matching the biometric data with authentication data for the user.

39. The non-transitory computer-readable storage medium of claim 18, wherein the instructions for unlocking the locking device includes at least one of an unlock code, password, combination code, or one or more steps for unlocking the locking device.

40. The non-transitory computer-readable storage medium of claim 18, wherein the one or more programs further comprise instructions, which when executed by the one or more processors of the electronic device, cause the electronic device to:

determine a communication's medium associated with the electronic device for providing instructions to the user; and provide the instructions to the user using the determined communication.

41. The non-transitory computer-readable storage medium of claim 40, wherein the communication's medium is at least one of a display screen on the electronic device, speaker of the electronic device, a virtual reality display, and an augmented reality display associated with the electronic device.

42. The non-transitory computer-readable storage medium of claim 18, wherein the real-world environment is a surrounding environment of the user providing the user request.

43. The non-transitory computer-readable storage medium of claim 18, wherein the contextual information includes at least one information about the user, information about the electronic device, or information about circumstances surrounding the user request.

44. The non-transitory computer-readable storage medium of claim 18, wherein providing the instructions to the user comprises:

creating an animation involving the instructions and the one or more objects; and presenting the animation on a user interface within the electronic device.

45. The non-transitory computer-readable storage medium of claim 18, wherein at least one of the one or more objects is a locking device or a physical object surrounding the locking device.

46. The non-transitory computer-readable storage medium of claim 18, wherein the biometric data of the user includes at least one of fingerprint data, facial identification data, voice data, or eye scan data.

47. The non-transitory computer-readable storage medium of claim 18, wherein the one or more programs further comprise instructions, which when executed by the one or more processors of the electronic device, cause the electronic device to:

in response to obtaining instructions for unlocking the locking device:

unlock the locking device remotely using the instructions.

48. The non-transitory computer-readable storage medium of claim 18, wherein the one or more programs further comprise instructions, which when executed by the one or more processors of the electronic device, cause the electronic device to:

in response to scanning the one or more objects:

identify at least one of the one or more objects;

authenticate the user based on biometric data and contextual information;

obtain private information for the at least one object in response to authenticating the user; and provide the private information to the user.

* * * * *